(12) United States Patent
Hackmann et al.

(10) Patent No.: US 8,880,463 B2
(45) Date of Patent: Nov. 4, 2014

(54) STANDARDIZED FRAMEWORK FOR REPORTING ARCHIVED LEGACY SYSTEM DATA

(75) Inventors: Herbert Hackmann, Wiesloch (DE); Axel Herbst, Eppingen-Rohrbach (DE); Jan Nolte-Boemelburg, Bad Schönborn (DE); Frank Rust, Heidelberg (DE)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 13/358,156

(22) Filed: Jan. 25, 2012

(65) Prior Publication Data

US 2013/0191328 A1 Jul. 25, 2013

(51) Int. Cl.
G06F 17/30 (2006.01)

(52) U.S. Cl.
USPC .............................. 707/609; 707/769; 707/808

(58) Field of Classification Search
USPC .................. 707/609, 769, 808, 770, 622, 602; 709/223
See application file for complete search history.

(56) References Cited

U.S. PATENT DOCUMENTS

| | | | |
|---|---|---|---|
| 7,467,198 B2 * | 12/2008 | Goodman et al. ............ | 709/223 |
| 8,560,568 B2 * | 10/2013 | Gilder et al. .................. | 707/770 |
| 2001/0034771 A1 * | 10/2001 | Hutsch et al. ................. | 709/217 |
| 2003/0004774 A1 * | 1/2003 | Greene et al. ..................... | 705/8 |
| 2005/0044197 A1 * | 2/2005 | Lai ................................ | 709/223 |
| 2005/0071286 A1 * | 3/2005 | Laicher et al. ................ | 705/400 |
| 2005/0071348 A1 * | 3/2005 | Laicher et al. ................ | 707/100 |
| 2005/0240621 A1 * | 10/2005 | Robertson et al. ............ | 707/102 |
| 2006/0059253 A1 * | 3/2006 | Goodman et al. ............ | 709/223 |
| 2007/0061304 A1 * | 3/2007 | Gung et al. ....................... | 707/3 |
| 2007/0276861 A1 * | 11/2007 | Pryce et al. ............. | 707/103 R |
| 2012/0023193 A1 * | 1/2012 | Eisner et al. .................. | 709/217 |
| 2013/0173539 A1 * | 7/2013 | Gilder et al. .................. | 707/622 |
| 2014/0040182 A1 * | 2/2014 | Gilder et al. .................. | 707/602 |

* cited by examiner

*Primary Examiner* — Jean M Corrielus
(74) *Attorney, Agent, or Firm* — Kenyon & Kenyon LLP (57) ABSTRACT

Legacy computing system archive files may have unique data structures designed for long-term data retention purposes and not particularly suited for data mining, querying, and other data collection functions needed to prepare certain types of reports. A report specific template may be created to facilitate the extract of specific legacy system data necessary to complete report that is stored in legacy system archive files. Once the data objects containing information relevant to the report have been identified, a hierarchical list of tables and fields of each table associated with each identified data object may be obtained from an external data source for further selection. Copies of the selected table and/or field data may then be extracted, compared, and merged with other data, such as other field and table data, obtained from other sources.

17 Claims, 10 Drawing Sheets

Legacy System Identifier Input 410

STANDARDIZED FRAMEWORK FOR REPORTING ARCHIVED LEGACY SYSTEM DATA

BACKGROUND

Many organizations routinely upgrade their computing systems and architecture. Over time, organizations may change computing platforms or infrastructures resulting in certain computing systems and technologies becoming outdated or obsolete. Computing systems and technologies that are considered outdated or obsolete are referred to as legacy systems. Computing systems and technologies that are not outdated or obsolete are referred to as non-legacy systems. While organizations may chose to replace these legacy systems with newer, more efficient non-legacy computing systems and technologies, an organization may also choose not to migrate their data from the older legacy system into the newer computing system. Instead, the organization may choose to archive or otherwise preserve the organization's existing data in the legacy system and then use the newer, more efficient computing systems for all future transactions and processing functions.

This hybrid approach of archiving the existing legacy system data may be done in part to satisfy legal record retention requirements, such as for tax or auditing purposes. Organizations may also decide that archiving the existing legacy system is more cost effective than attempting to extract and migrate the legacy system data into the newer, more efficient systems.

While it may be more cost effective in a broad overall sense for an organization to archive its existing legacy system data instead of attempting to integrate it into its newer computing systems, it also becomes more difficult to generate reports on the archived data from the legacy systems.

For example, the existing legacy system data may be archived in files that contain serialized objects in which data records from different tables are assembled into one object instance so that the file and data object are readable as a stand alone file without the need to access another file. Thus, multiple files may contain copies of similar data records so that each file can be read as a stand alone file. At the same time, each file may not necessarily store complete tables; for example, only some of the records of a single table may stored in a single file as those records in a table that are not relevant to the data object are not stored in that respective file.

While this data structure is more efficient for long-term record retention, it is extremely inefficient for running queries that do not match the internal structure of these archived data object files. For example, a query for searching each record in a table may be very inefficient since multiple files may contain copies of the same records though none of the files may contain a complete set of all records in the table.

Thus, aggregating, organizing, and/or generating reports on this archived data has been very inefficient and cumbersome. There is a need for a more efficient data retrieval from these archived data files in order to facilitate analytical reporting of archived data.

DETAILED DESCRIPTION

In an embodiment of the invention, a report template may be created for each type of report including archived legacy system data stored in a legacy computing system archive file. The report template may identify data objects containing information relevant to the report. The report template may also identify which computing systems the data objects were used in, including legacy systems and/or legacy system archive files containing these particular data objects. For example, a tax audit report template may specify data objects in particular legacy system archive files that may contain financial transactional information necessary for tax preparation.

Once the data objects containing information relevant to the report have been identified, a hierarchical list of tables and fields of each table associated with each identified data object may be obtained from an external data source. The data source may be a data object configuration file, a lookup table, or other source separate from the archive files of the legacy system. A selection tool containing the hierarchical list may be then presented to a user for the user to select one or more tables or fields containing data that the user would like included in the report.

Thereafter, one or more legacy computing system archive files may be checked to identify those archive files including the selected tables or fields. A legacy computing system archive file may contain a copy of data stored in a legacy computing system. The legacy computing system archive file may have a unique data structure that is designed for long-term data retention purposes. As part of this unique data structure, each data object may be assigned a unique archiving file. A complete and self-contained set of all data in the legacy computing system relating to that data object may be included in its unique archiving file and data that does not relate to that data object need not be included in its unique archiving file.

The archiving file therefore need not include a complete set of data, records, tables or table fields. Only those tables, records, fields, and data relating to that data object may be included in the archiving file. Thus, in some instances, only a subset of tables, fields, records, and data may be included in each archiving file. Additionally different archiving files may contain copies of some of the same fields, tables, and other data included in other archiving files associated with different data objects.

A processing device may be used to identify those archiving files associated with the data objects identified in the report template that include the selected tables and/or fields. After identifying the archiving files containing the selected tables or fields, a copy of the selected table and/or field data may then be extracted from the identified archiving files.

The data extracted from the legacy computing system archive files may then be compared and merged with other data, such as other field and table data, obtained from other sources. These other sources may include data obtained from the archive files of other legacy computing systems, or data obtained from non-legacy computing systems. In some instances the merged data may be deleted after outputting a consolidated result from the merged data. In other instances, the merged data may be saved and later recalled for use in future reports.

In those situations where one or more the computing systems is a non-legacy system, the data may be stored contiguously, so that each table may be stored in its entirety with a complete set of fields, records, and data. This may make it much more efficient to execute queries and obtain data that is to be included in a report. In those instances where a report included data from both legacy and non-legacy computing systems, the desired data may be obtained directed from the non-legacy system, and the obtained table or field data may be merged with the table or field data extracted from the legacy computing system archive file or files.

Figure 6:
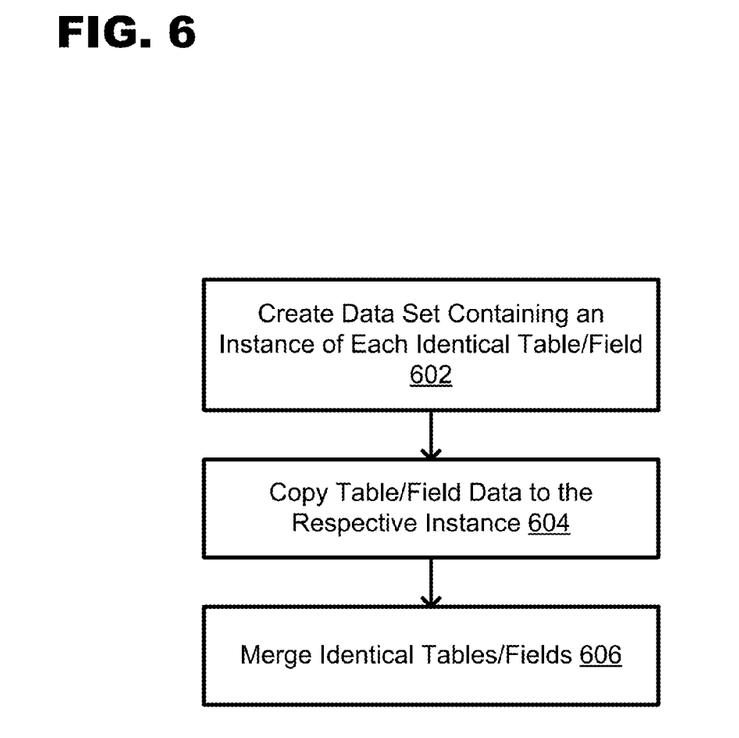
FIG. 6 shows an exemplary process in an embodiment.

FIG. 6 shows an exemplary process in an embodiment of the invention. In some instances, a new dataset containing the merged data from the legacy and non-legacy systems may be created (Box 602). This new dataset may include a single instance of each identical table and field in both legacy and non-legacy systems. The table and field data from both the legacy and non-legacy systems may be copied into the respective single instance of each identical table and field, so that the data appears continuous as though it came from a single system instead of two separate systems (Box 604). The new dataset may then be outputted as a consolidated result from both systems. The consolidated result may then be used to generate a final report (Box 606).

Figure 7:
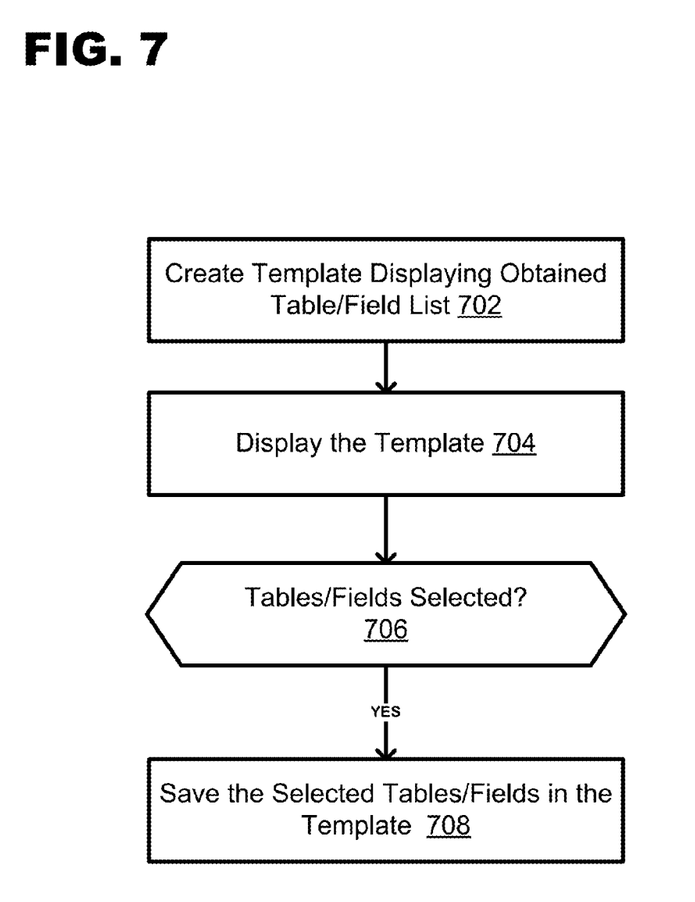
FIG. 7 shows an exemplary process in an embodiment.
Figure 10:
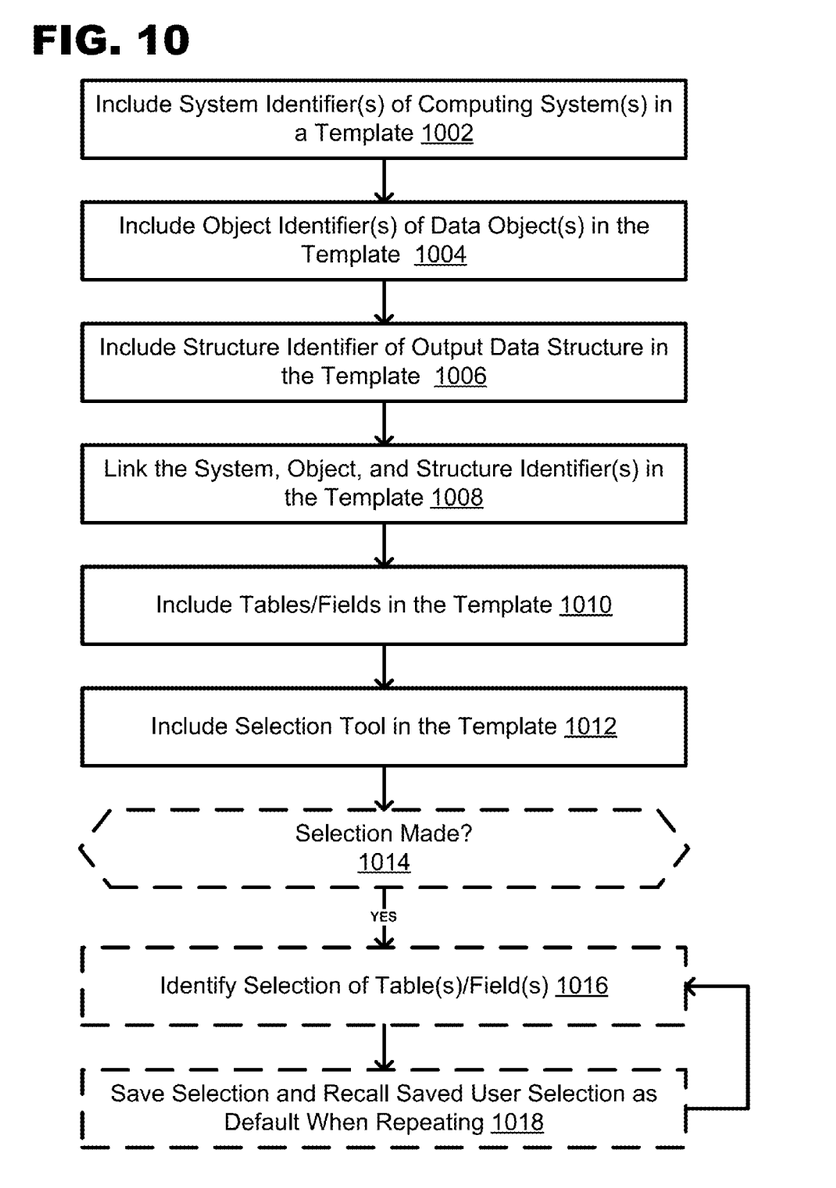
FIG. 10 shows an exemplary process in an embodiment.

FIG. 7 and FIG. 10 show exemplary processes in embodiments of the invention. In some instances, a user may be presented with the hierarchical list of tables or fields associated with each identified data object from which the user may select one or more of the tables and fields that are to be included in the final result. A template may be created to display, in a hierarchical manner, each of the tables and fields associated with the identified data objects that are obtained from the external data source (Box 702 and Box 1002). The template may be presented to the user, and in some instances, the template may also identify those data objects containing information relevant to the report (Box 704 and Box 1004). The template may also identify which computing systems the data objects were used in (Box 1002). Once the user selects one or more tables or fields in the template, the selected tables or fields in the template may be saved as the identified selection (Boxes 706 and 708).

The template may also include an identifier of an output data structure that the consolidated result is to be outputted to (Box 1006). The identifications of the data objects containing information relevant to the report, the computing systems that contain the data objects and the output data structure may all be linked to each other and included in the template (Box 1008). The hierarchical tables and fields of the data objects may also be included in the template with a selection tool enabling a selection of at least one of the tables and fields included in the template (Boxes 1010 and 1012). The selection tool may provide an interface, such as check boxes, to enable a user selection of the tables and fields included in the template (Box 1014). The selection of at least one of these tables and fields may be identified when the user makes a selection through the selection tool (Box 1016). In some instances, the user selection may be saved and later recalled as a default selection when the process is repeated (Box 1018).

As discussed previously, the legacy computing system archive files may include a subset of tables, fields, records, and data that may relate only to the particular data object associated with the respective archive file. Each archive file may therefore contain multiple fields from several different tables. In addition to storing the data associated with each of these multiple fields, the archive file may also store relationship information establishing a link between the data fields in different tables. This relationship information may also be extracted from the identified archive files along with other table and field information. The relationship information may also be included in any output so as to preserve the relationship between the fields in the final output.

Figure 8:
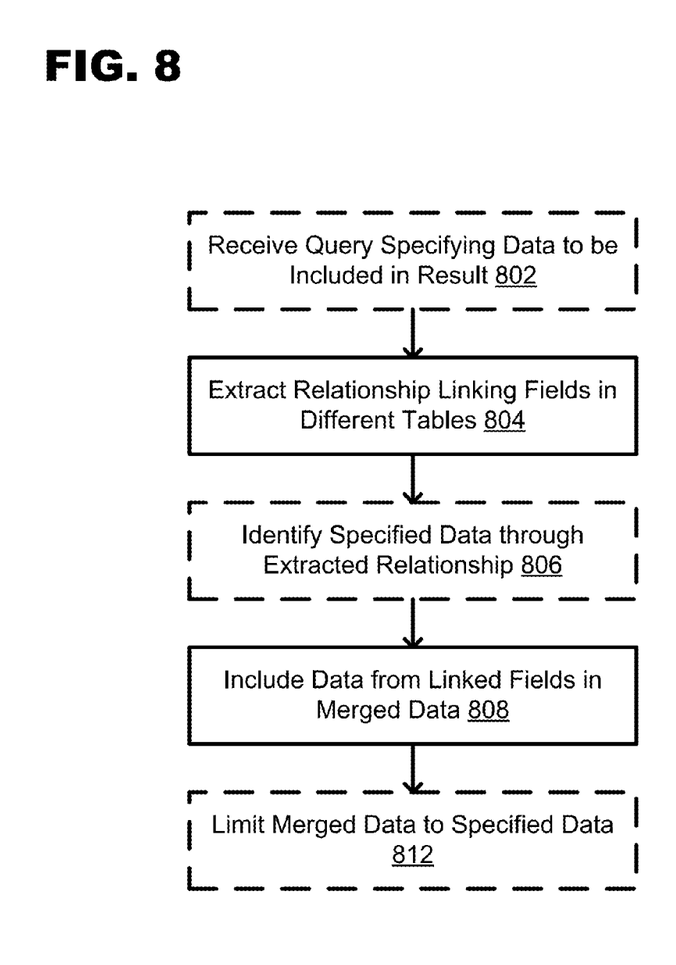
FIG. 8 shows an exemplary process in an embodiment.

FIG. 8 shows an exemplary process in an embodiment of the invention. In some instances, prior to extracting data from an archive file, merging the extract data, and/or outputting a consolidated result from the merged data, a query specifying particular data to be included in the outputted result may be received (Box 802). This query may specify a particular subset of data within the selected at least one table or field that is to be included in the final output. In this situation, the outputted result may be customized or limited so that only the particular data specified in the query is outputted (Boxes 808 and 812). This limiting of the output may occur when extracting data from the archive file, merging the extracted data, and/or outputting the consolidated result.

The particular data specified in the query that is to be included in the outputted result may also be identified through the relationship information establishing a link between data fields of different tables in the archive file (Box 804 and 806). Data from these linked fields specified in the query may be included in the merged data and the outputted consolidated result.

Figure 9:
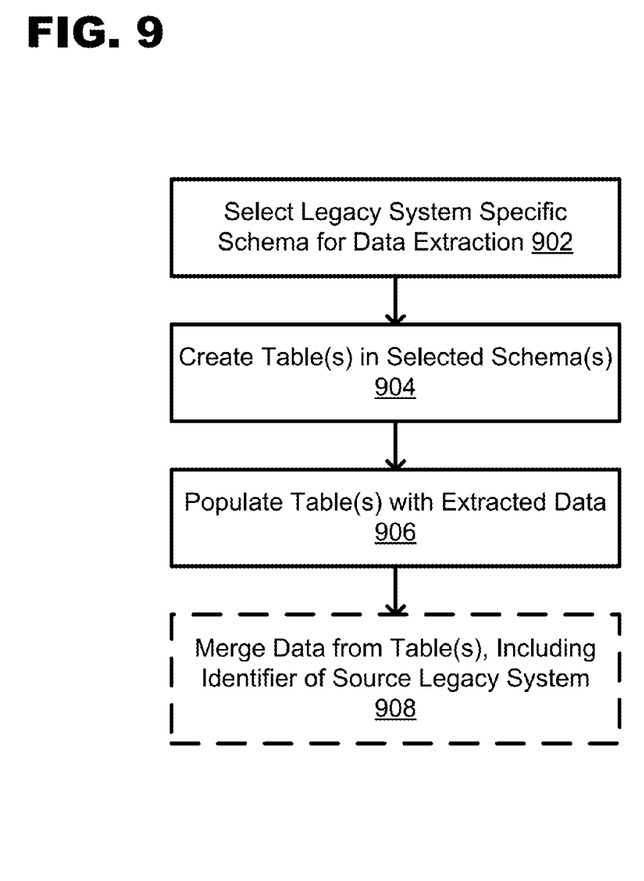
FIG. 9 shows an exemplary process in an embodiment.

FIG. 9 shows an exemplary process in an embodiment of the invention. Each legacy system and legacy system archive file may have its own unique data structures and languages. In some embodiments, a specific schema unique to each legacy system may be created (Box 902). The specific schemas may provide instructions enabling the extracting of data from each type of legacy computing system, the creation of tables and other data structures for storing the extracted data, and the population of the tables and other data structures with data extracted from the legacy system (Box 904). In some instances, a plurality of tables may be created in a plurality of schemas. Each of the tables may be populated with data extracted from a corresponding legacy system associated with the respective schema (Box 906). Data from the plurality of tables may be merged together and the merged data may include an identifier of the source legacy system from which the respective data was extracted (Box 908).

Figure 1:
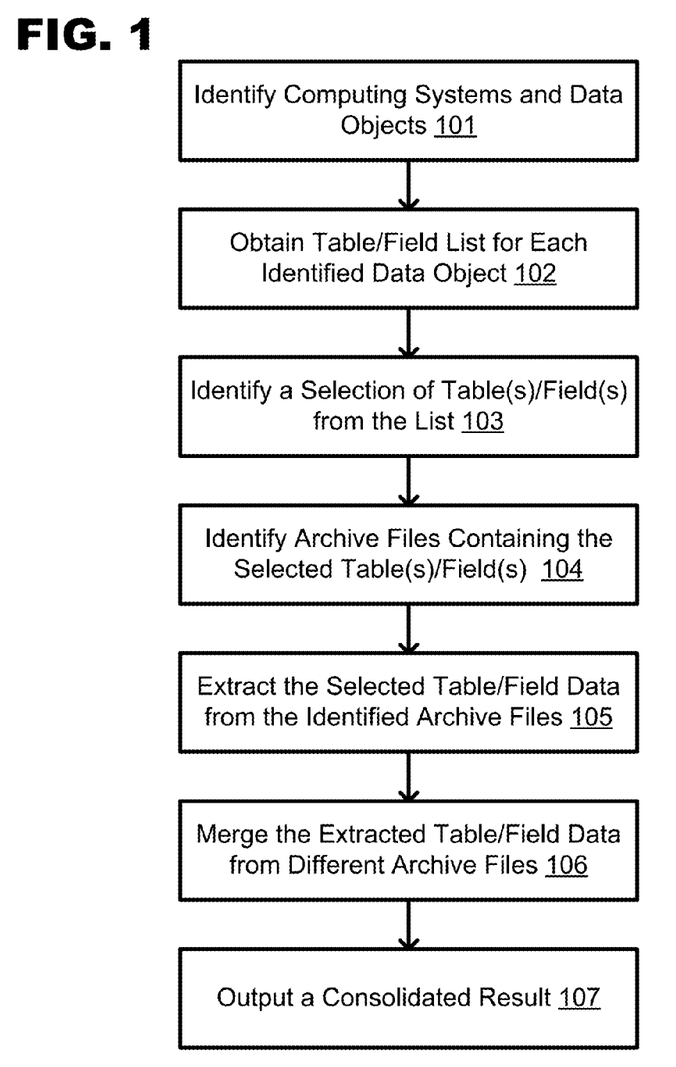
FIG. 1 shows an exemplary process in an embodiment of the invention.

FIG. 1 shows an exemplary process in an embodiment of the invention. In box 101, at least one legacy computing system and at least one other computing system containing data to be included in a report may be identified. Additionally, two or more data objects from these identified computing systems may also be identified. The at least one other computing system may be either a legacy or a non-legacy system.

In box 102, a hierarchical list of tables and fields of each table associated with each identified data object in box 101 may be obtained from an external data source independent of a legacy computing system archive file. The external data source may be a lookup table, configuration file, or other data source.

In box 103, a selection of at least one table or field from the hierarchical list may be identified. This selection may be made by a user through a selection tool, or the selection may be a predetermined selection specified by another program, process, or query.

In box 104, a processing device may be used to identify archive file(s) of the identified legacy computing system(s)

that include the table(s) and/or field(s) selected in box 103. The data from each legacy computing system may be stored in several archive files. Each of the archive files may archive a self-contained set of data specific to a particular data object in the legacy computing system. This self-contained set of data may include a subset of tables and fields of tables in a respective legacy computing system that is associated with the particular data object, such that different fields and components of a table may be included in different archive files.

In box 105, the processing device may be used to extract the selected table(s) and/or field(s) from the identified legacy computing system archive files.

In box 106, the extracted table(s) and/or field(s) from the archive files may be merged with data obtained from any remaining of the at least two computing systems.

In box 107, a consolidated result from the merged data may be outputted.

Figure 2:
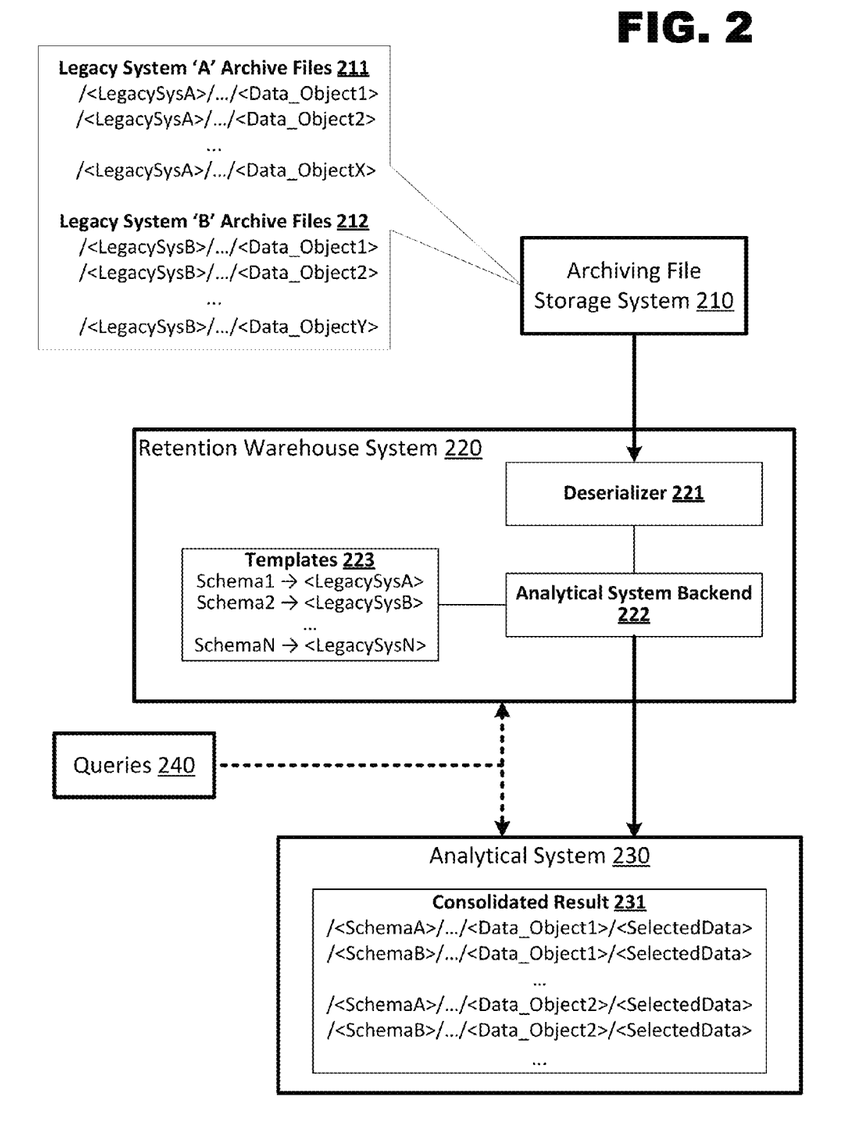
FIG. 2 shows an exemplary block diagram in an embodiment of the invention.

FIG. 2 shows an exemplary block diagram in an embodiment of the invention. An archiving file storage system 210 may store several archiving files containing the data and metadata of several legacy systems. For example, the storage system may store archiving files 1 to X 211 containing data from legacy system A and archiving files 1 to Y 212 containing data from legacy system B. Each of these archiving files 211 and 212 may include a complete and self-contained set of data relating to a particular data object in each respective legacy system.

The storage system 210 may be communicatively coupled to a retention warehouse system 220. The retention warehouse system 220 may include a deserializer 221, an analytical system backend 222, and one or more templates 223. The deserializer 221 may extract a copy of data from one or more of the archive files 211 and 212 and creates one or more tables from the extracted data. The templates 223 may specify both the particular archiving files 211 and 212, and particular tables, fields, and other data, that the deserializer 221 is to extract from the particular archiving files 211 and 212. The analytical system backed 222 may serve as a coordinator for ensuring that tables, fields, and other data identified in the templates 223 is then extracted from the particular archiving files 211 and 212, converted into tables by the deserializer 221 and then transmitted or pushed to analytical system 230.

Since each legacy system may tables, fields, and other data with identical names of those in different legacy and non-legacy systems, the deserializer 221 and/or the analytical system backend 222 may provide for unique naming conventions or different schemas for extracting and converting the data from archiving files of different legacy systems. The analytical system backend 222 may also merge the extracted tables or fields from the different legacy system archive files and push an outputted consolidated result 231 from the merging to the analytical system 230.

The analytical system 230 may then generate a final report from the outputted consolidated result 231. In some instances either the analytical system 230 or the analytical system backend 222 may also merge the extracted tables or fields from the legacy system archive files with similar data obtained from other computing systems. A consolidated result 231 of the merging of the data from these different systems may then be outputted by the analytical system 230 in the final report.

In some instances, the analytical system 230 may include an in-memory database system in which database information may be stored in main memory on volatile memory devices instead of on a disk storage medium. The in-memory database system may form part of a high performance analytical appliance system (HANA). HANA may include one or more user selectable data views containing corresponding data transformation and/or adaptation code to convert the outputted table data into a selected view format. This may eliminate a need for individualized table-specific data transformation and/or adaptation code to convert the archived data into a particular format corresponding to a selected view. Instead, the archived data may be converted into a generic table and push into HANA, after which a user may selected a desired data view through HANA for further conversion into the selected view format.

Moreover, HANA may also include already proven and standardized analytical content, including different analytical, calculation, and attribute views, previously developed and used for other purposes. In some instances, it may be quicker and more efficient to directly apply this previously created content to the data extracted from the legacy systems instead of creating new content from scratch. The results may also be presented consistently irrespective of the data source. Thus, data from both current and different legacy systems may be presented as though they originated from a single system. Additionally, the same reporting criteria, formats, and structures may also be used to facilitate the reporting of data from either many different legacy systems or from a combination of legacy and non-legacy systems. This may make it easier for a user to retrieve, search, and organize the data from these different systems.

Finally, the in-memory features of HANA may enable quicker calculations and faster reporting of final results to enable reports to be generated more efficiently. Thus, using HANA may result in faster, standardized, and more robust reporting of data from legacy system.

The analytical system 230 may also process further queries 240 before generating the final report. In some instances, these queries 240 may be processed within the analytical system 230, after the consolidated result 231 has been outputted so that the queries are executed only on the legacy system data that has been pushed or transmitted to the analytical system 230 from the retention warehouse system 220. In other instances, a criterion of the query 240 may be processed prior to extracting data from an archive file, merging the extract data, and/or outputting a consolidated result from the merged data. In this situation, the outputted result 231 may be customized or limited so that only the particular data specified in the query is outputted. This limiting of the output may occur when extracting data from the archive file, merging the extracted data, and/or outputting the consolidated result 231.

Figure 3:
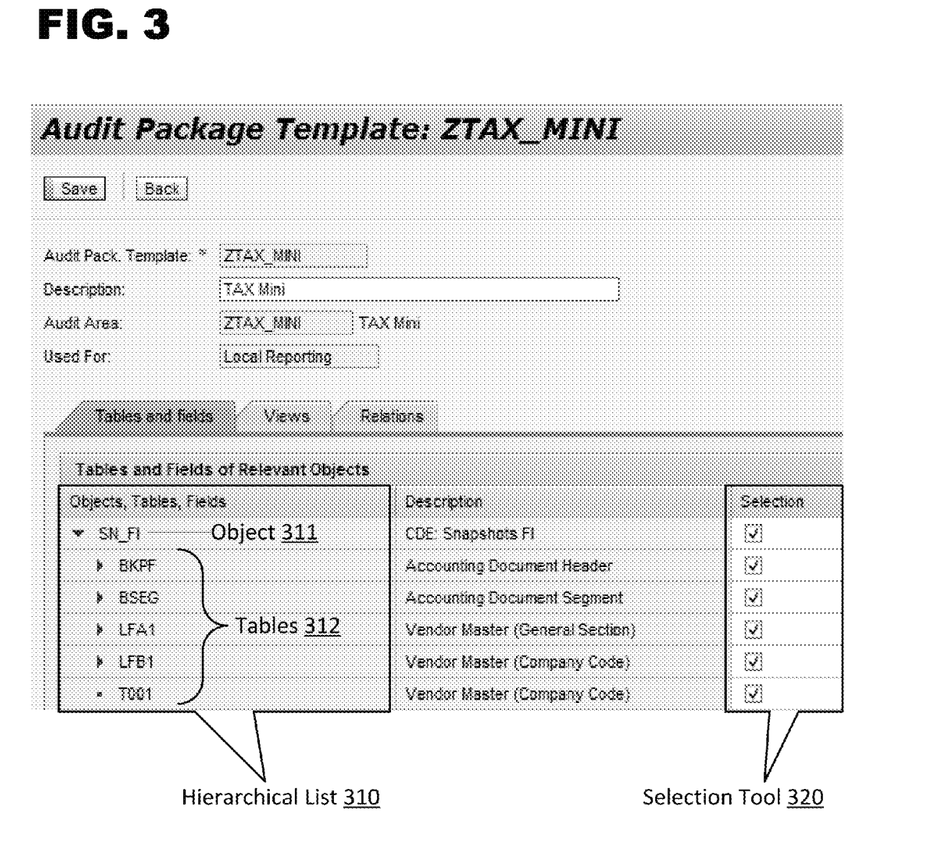
FIG. 3 shows a first exemplary template interface in an embodiment.

FIG. 3 shows a first exemplary template interface in an embodiment. This interface shows the hierarchical list 310 of tables 312 associated with each identified data object 311 (in this case the object SN_FI is shown) obtained from an external data source. The interface also shows a check box selection tool 320 from which a user may select the tables 312 and/or fields of each table obtained from the archive files that should be included in the output.

Figure 4:
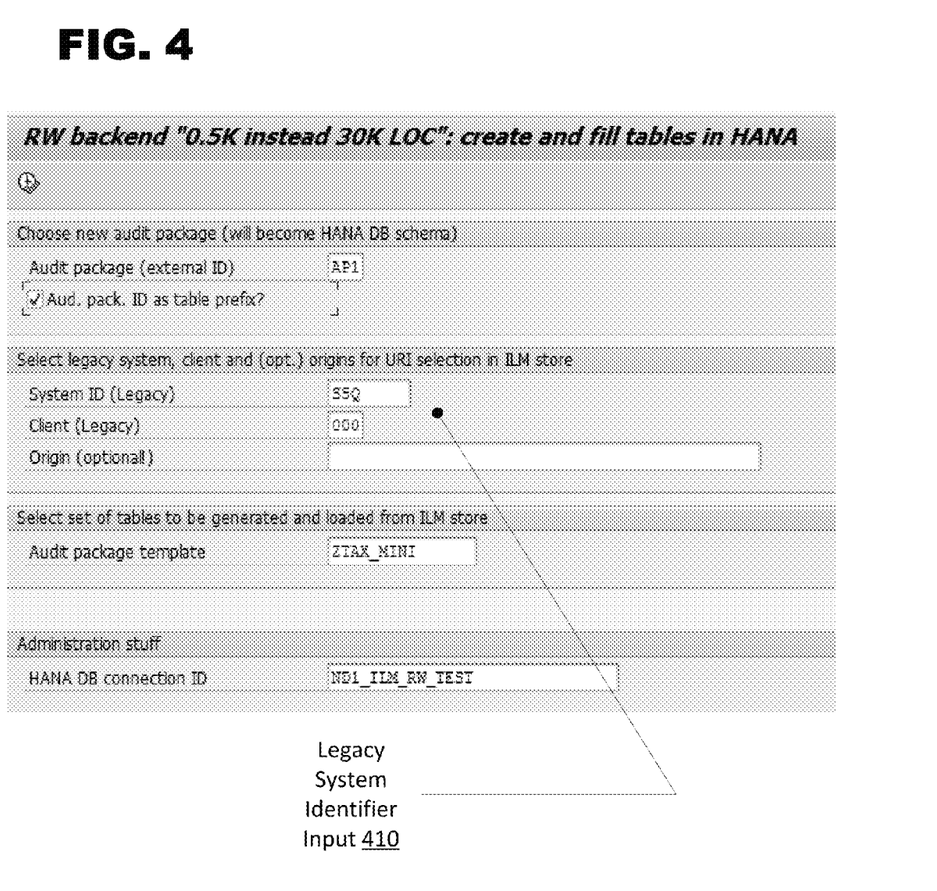
FIG. 4 shows a second exemplary template interface in an embodiment.

FIG. 4 shows a second exemplary template interface in an embodiment. This interface enables a user to input 410 a legacy system identifier to identify a set of archive files associated with the legacy system that contain relevant data that may be included in the report. In some instances, more than one legacy system identifier may be inputted 410. In some instances, specific data objects included in each of these legacy systems may also be identified. These data objects may be inputted by a user or the data objects may be identified from a configuration file, lookup table, or other source. The template FIG. 3 may include all of the identified objects from each of the inputted legacy systems 410 in the hierarchical list 310, as well as any subordinate table, field, or other nodes to the identified object.

Figure 5:
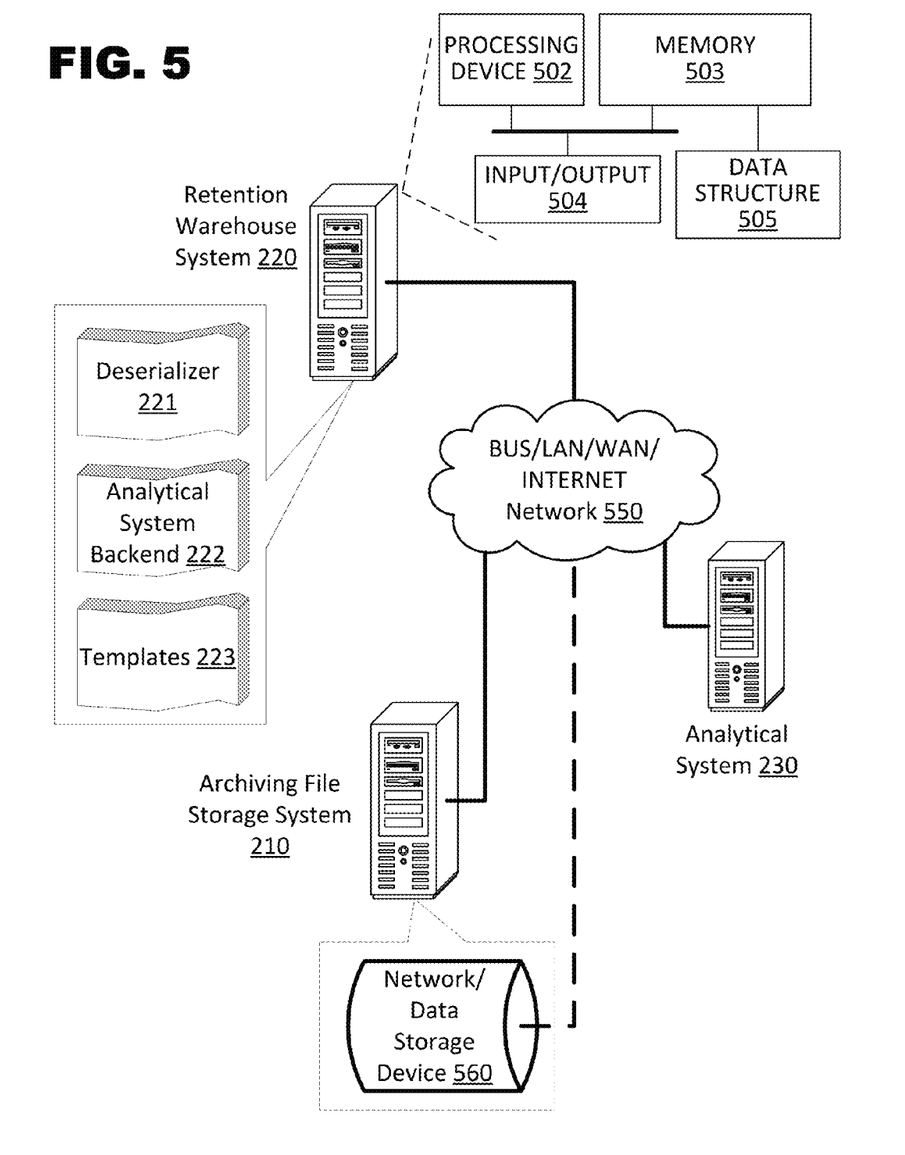
FIG. 5 shows an exemplary architecture in an embodiment of the invention.

FIG. 5 shows an exemplary architecture in an embodiment of the invention. An archiving file storage system 210 may be communicatively connected to a retention warehouse system 220 and an analytical system 230 through a network 550.

The archiving file storage system 210 may include a storage device 560 storing each of the archiving files of different legacy systems. The storage device 560 may be a part of the archiving file storage system 210. In some embodiments the network storage device 560 may also be separate from the archiving file storage system 210 but connected to it through network 550. The storage device 560 may contain a hard disk drive, flash memory, or other computer readable media capable of storing data.

The retention warehouse system 220 may include a deserializer 221, analytical system backend 222, and one or more templates 223 for extracting legacy system data for particular reports.

The analytical system 230 may process the legacy system data provided by the retention warehouse system 220 and generate final reports incorporate the legacy system data.

Each of the systems, clients, and devices in FIG. 5 may contain a processing device 502, memory 503 storing loaded data or a loaded data structure 505, and a communications device 504, all of which may be interconnected via a system bus. In various embodiments, each of the systems 210, 220, 230, and 560 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, the deserializer may include one or more integrated circuits and/or microprocessing units separate from the processing device in some embodiments, but in other embodiments, the deserializer may use the processing device of the retention warehouse system.

We claim:

1. A method comprising:
    identifying at least two computing systems and a plurality of data objects from the identified computing systems containing predetermined data, wherein at least one of the computing systems is a legacy computing system;
    obtaining a hierarchical list of tables and fields of each table from an external data source, wherein each of the tables and fields is associated with at least one of the plurality of data objects;
    identifying a selection of at least one table or field from the hierarchical list;
    identifying, using a processing device, legacy computing system archive files that include the selected at least one table or field, wherein each archive file archives data;
    extracting, using the processing device, the selected at least one table or field from the identified legacy computing system archive files;
    merging the extracted tables or fields from the archive files with data obtained from the at least two computing systems;
    outputting a consolidated result from the merged data;
    selecting a legacy system specific schema for extracting data from each type of legacy computing system;
    creating a table in the selected schema;
    populating the created table with data extracted from a legacy system having a type corresponding to a type of the selected legacy system specific schema.

2. The method of claim 1, further comprising, when at least one of the two computing systems is a non-legacy computing system, merging table or field data obtained from the non-legacy computing system with the extracted tables or fields from the archive files.

3. The method of claim 2, further comprising:
    creating a new dataset containing a single instance of each identical table and field;
    copying the table and field data from each computing system into the respective single instance of each identical table and field to merge the identical tables or fields; and
    outputting the new dataset as the consolidated result.

4. The method of claim 1, further comprising:
    creating a template displaying each of the obtained hierarchical lists of tables and fields of each table associated with each identified data object;
    displaying the created template; and
    responsive to a selection by a user of tables or fields, saving the selected tables or fields in the template.

5. The method of claim 1, further comprising:
    extracting a relationship linking data fields in different tables from the identified archive files; and
    preserving the relationship in the outputted consolidated result.

6. The method of claim 5, further comprising:
    receiving a query specifying data included in the consolidated result; and
    limiting the merged data to the specified data in the query.

7. The method of claim 6, further comprising:
    identifying the specified data in the identified archive files through the extracted relationship linking the data fields in the different tables; and including data from the linked data fields in the merged data.

8. The method of claim 1, further comprising deleting the merged data after outputting the consolidated data.

9. The method of claim 1, further comprising:
creating a plurality of tables in a plurality of selected schemas;
populating each created table with data extracted from corresponding legacy system types;
merging data from the plurality of created tables, the merged data including an identifier of a corresponding source legacy system from which the data was extracted.

10. The method of claim 1, further comprising:
including an identifier of each of the at least two computing systems in a template;
including an identifier of each identified data object from each of the at least two computing systems in the template;
including an identifier of an output data structure in the template;
linking each of the above included identifiers in the template to each other;
including the obtained hierarchical list of tables and fields in the template; and
including a selection tool in the template enabling a selection of at least one of the tables and fields included in the template.

11. The method of claim 10, further comprising identifying the selection of the at least one table or field from the hierarchical list responsive to a user selection through the selection tool of the at least one of the tables and fields included in the template.

12. The method of claim 11, further comprising saving the user selection and recalling the saved user selection as a default selection when repeating the method.

13. The method of claim 12, wherein each of the identified computing systems is a legacy computing system.

14. A non-transitory computer readable medium comprising stored instructions that, when executed by a processing device, cause the processing device to:
identify at least two computing systems and a plurality of data objects from the identified computing systems containing predetermined data, wherein at least one of the computing systems is a legacy computing system;
obtain a hierarchical list of tables and fields of each table from an external data source, wherein each of the tables and fields is associated with at least one of the plurality of data objects;
identify a selection of at least one table or field from the hierarchical list;
identify legacy computing system archive files that include the selected at least one table or field, wherein each archive file archives data;
extract the selected at least one table or field from the identified legacy computing system archive files;
merge the extracted tables or fields from the archive files with data obtained from the at least two computing systems;
output a consolidated result from the merged data;
select a legacy system specific schema for extracting data from each type of legacy computing system;
create a table in the selected schema;
populate the created table with data extracted from a legacy system having a type corresponding to a type of the selected legacy system specific schema.

15. A system comprising:
a processing device;
a communications device;
a template specifying:
at least one archive file from which a copy of data is extractable; and
a list of tables and fields that is extractable from the specified at least one archive file, responsive to a user selection of at least one table or field in the list;
a deserializer configured to:
select a legacy system specific schema for extracting data from each type of legacy computing system;
extract the copy of data from the at least one archive file through the communications device and the at least one of a table and a field selected by the user;
merge the extracted at least one of a table and a field from the at least one archive file with data obtained from at least two computing systems;
create at least one table from the extracted copy of data and in the selected schema; and
populate the created table with data extracted from a legacy system having a type corresponding to a type of the selected legacy system specific schema;
an analytical system backend outputting a consolidated result from the merged data and coordinating, using the processing device:
the extraction of at least one user selected table of field data from the specified archiving file, the creation of the at least one table from the extracted data, and a transmission of the at least one created table to an analytical system through the communications device.

16. The system of claim 15, wherein each archive file archives data from a subset of tables and fields of tables in a respective legacy computing system that is associated with a particular data object.

17. The system of claim 15, wherein at least one of the at least two computing systems is a legacy computing system.

* * * * *